Figure 1:
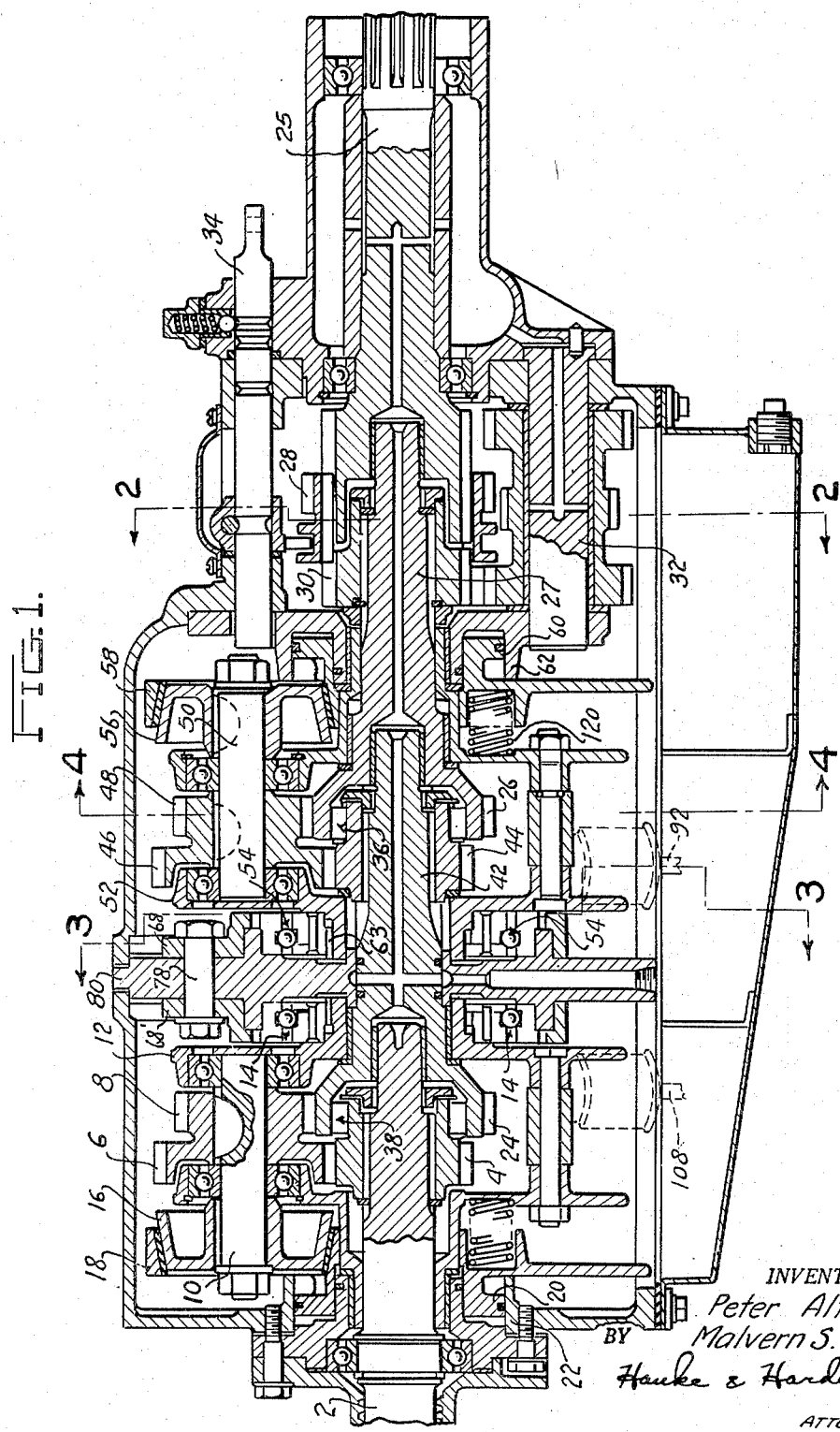

Oct. 10, 1950  P. ALTMAN ET AL  2,525,575
TRANSMISSION

Filed Oct. 18, 1946  4 Sheets-Sheet 2

INVENTOR.
Peter Altman
BY Malvern S. Baker
Hauke & Hardesty
ATTORNEYS

Oct. 10, 1950  P. ALTMAN ET AL  2,525,575
TRANSMISSION

Filed Oct. 18, 1946  4 Sheets-Sheet 4

INVENTOR.
Peter Altman
Malvern S. Baker
BY Hauke & Hardesty
ATTORNEYS

Patented Oct. 10, 1950

2,525,575

UNITED STATES PATENT OFFICE 2,525,575

TRANSMISSION

Peter Altman, Detroit, and Malvern S. Baker, Muskegon, Mich., assignors to Continental Motors Corporation, Detroit, Mich., a corporation of Virginia Application October 18, 1946, Serial No. 704,200

4 Claims. (Cl. 74—752)

This invention relates to power transmission apparatus, especially to power transmissions of the automatic type as are used on self-propelled vehicles.

It is desirable in automotive vehicles requiring a variable gear ratio between the power plant and the rear wheels, to provide for automatic means of varying the ratio. It is further desirable that the gear ratio be varied without interrupting the drive.

It is an object of this invention to provide a transmission of the type described in which the gear ratio between the engine and the propeller shaft may be varied from a maximum to direct drive, and that this variation may be accomplished with a minimum of attention by the operator of the vehicle and without interrupting the acceleration of the vehicle. It is a further object of the invention to accomplish the foregoing in a manner which takes into account the load put on the engine by the vehicle's resistance to acceleration.

The foregoing objects are accomplished in a transmission of the planetary type in which the gear ratio is varied from a maximum to direct drive by automatic controls responsive to speed and torque.

Figure 2:
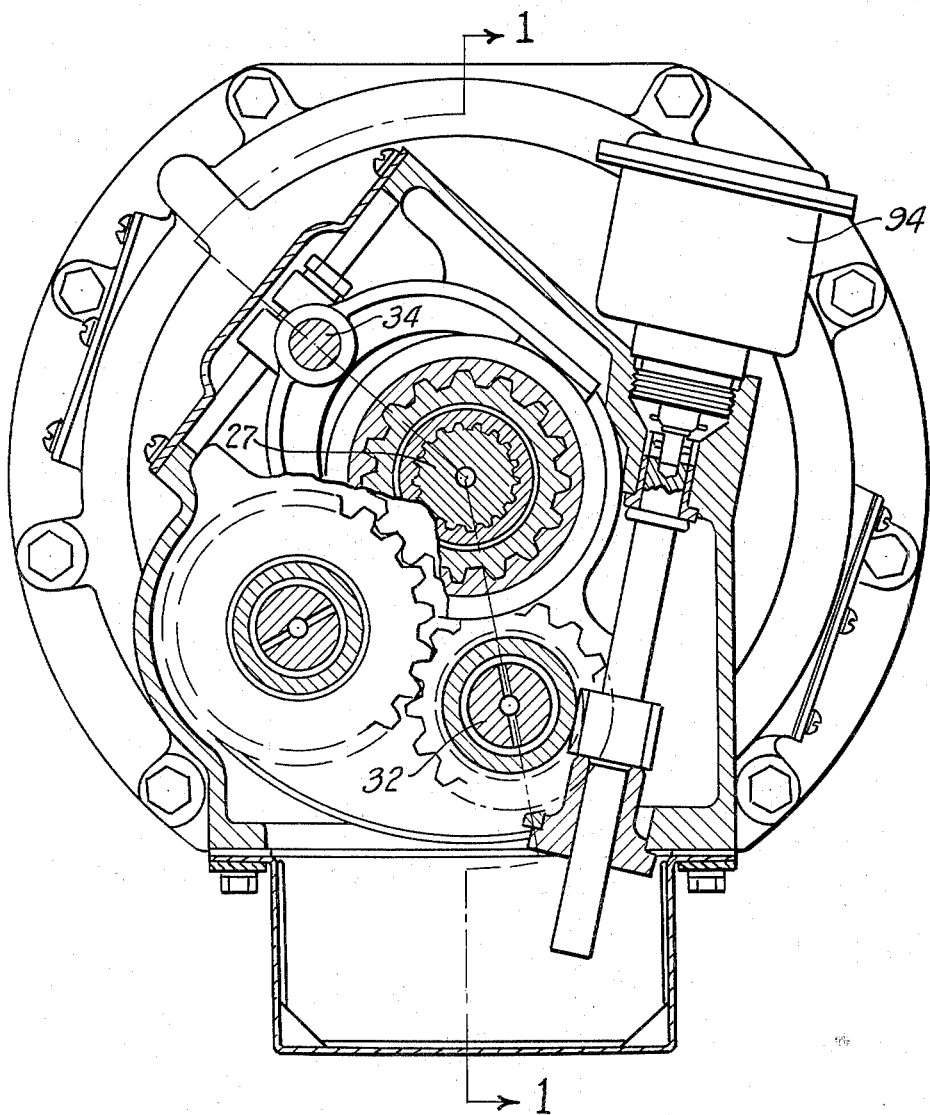
Figure 3:
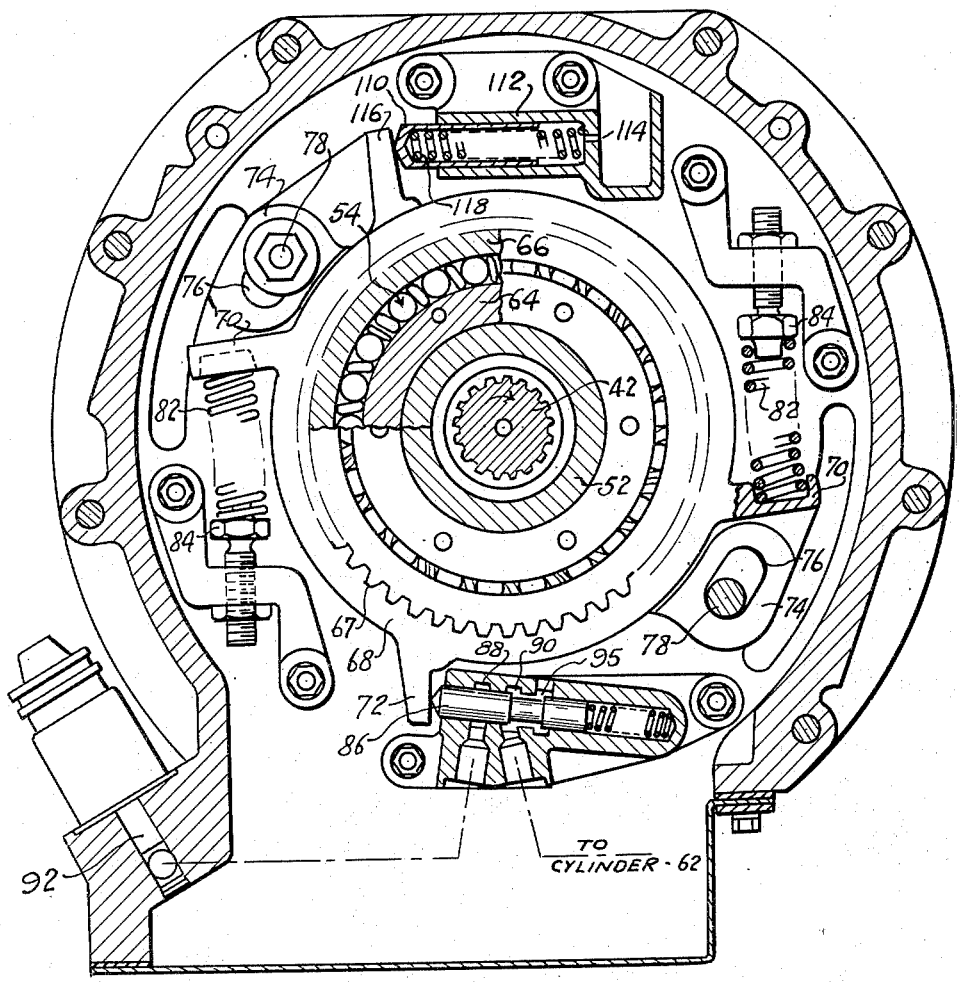
Figure 4:
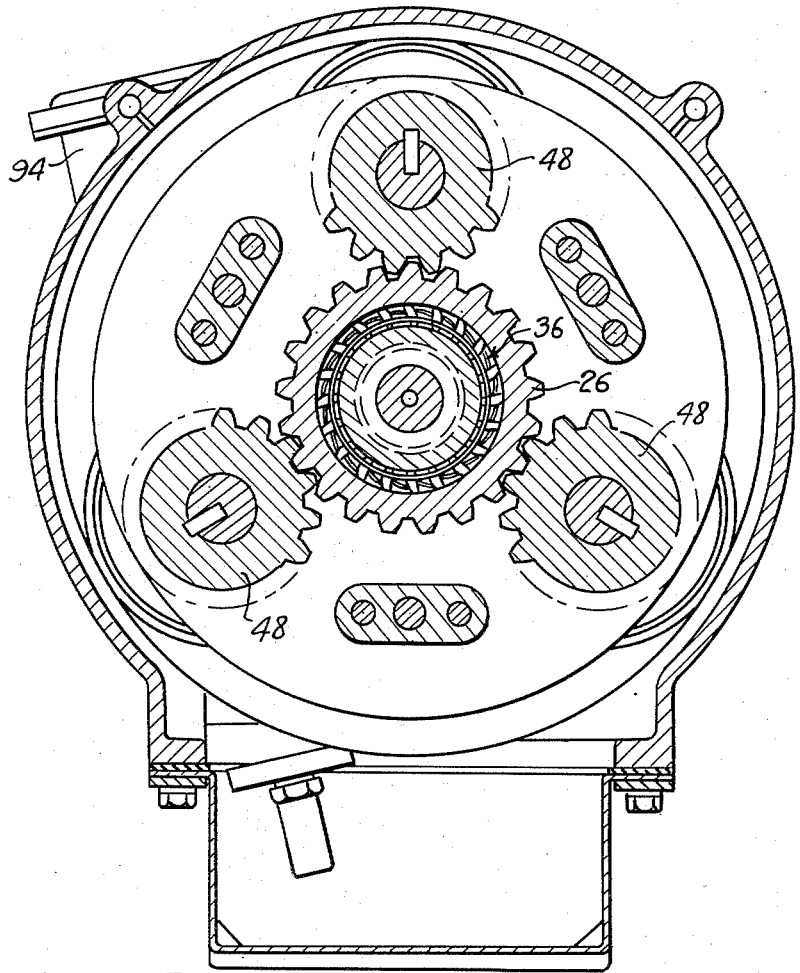
Figure 5:
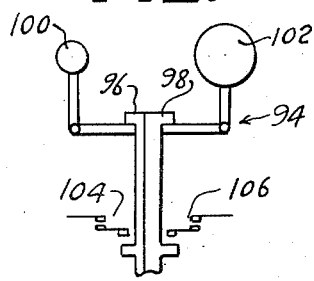

In the drawings:

Fig. 1 is a view in section on line 1—1 of Fig. 2.
Fig. 2 is a view in section on line 2—2 of Fig. 1.
Fig. 3 is a view in section on line 3—3 of Fig. 1.
Fig. 4 is a view in section on line 4—4 of Fig. 1, and
Fig. 5 is a schematic diagram of the two-stage governor.

An input shaft 2 is shown as being connected to deliver power to a planetary gear train. Shaft 2 drives the power or sun gear 4 of the planetary gear train. Meshing with power gear 4 is a second gear 6 which is a planet gear of the planetary gear train. Integral with planet gear 6 is a second planet gear 8. Gears 6 and 8 are mounted on shaft 10 for rotation in planet carrier 12 about their own axis.

Planet carrier 12 is mounted for rotation about the axis of power gear 4. Carrier 12 has only limited rotation in one direction, this limitation being accomplished by a one-way brake and bearing combination indicated generally at 14.

A brake is provided to prevent rotation of gears 6 and 8 about their axis. This brake may be any suitable type shown here in the form of a cone clutch having a rotating element 16 and a non-rotating engaging element 18. ("Rotation" as applied to elements 16 and 18 refers to rotation about the axis of shaft 10.) Engaging element 18 is movable axially of shaft 10 by means of piston 20, which is reciprocable in cylinder 22. Hydraulic fluid may be supplied to cylinder 22 from any suitable source.

Planet gear 8 meshes with a sun gear 24 which is connected to output shaft 25 through a second planetary gear train described in detail below, through output sun gear 26 and intermediate shaft 27, and through the reversing gear train comprising shifter gear 28, gear 30, and the plurality of gears shown rotatable on counter shaft 32. Shifter gear 28 is mounted to be reciprocated axially by shifter bar 34. The reverse gear train is shown in its position for forward drive. Intermediate shaft 27 is held against backward rotation by any suitable one-way clutch such as that indicated generally at 36. Similarly, sun gear 24 is held against reverse rotation by a one-way clutch 38.

Sun gear 24, referred to above, is shown as being integral with intermediate shaft 42. Sun gear 44 of the second planetary gear train is mounted for direct drive by shaft 42. Meshing with sun gear 44 is a planet gear 46; integral with planet gear 46 is another planet gear 48. Gears 46 and 48 are mounted for rotation with shaft 50 about their own axis in planet carrier 52. Planet carrier 52 is limited in its rotation in one direction by a suitable one-way brake indicated generally at 54.

A brake is provided to prevent rotation of gears 46 and 48 about their own axis. This brake may be any satisfactory type, such as the cone clutch shown, or a multiple disc clutch or the like, having a rotating element 56 and a non-rotating engaging element 58. Engaging element 58 is reciprocated axially by piston 60. Piston 60 is hydraulically actuated in cylinder 62 by any suitable fluid.

It will be seen that the two planetary gear trains are similar and that their associated planet gear brakes are substantially the same, as shown in Fig. 1. Also similar for the two gear trains are the means provided to limit backward rotation of the planet carriers. For a better understanding thereof, reference should be made to Figs. 1 and 3. Fig. 3 shows the one-way brake 54 and its associated mechanism, which is substantially the same as one-way brake 14 and its associated mechanism. Planet carrier 52 is secured (as by splines 63) to and drives inner brake ring 64. Outer brake ring 66 forms with inner brake ring 64 an annular channel in which are disposed the brake elements. Brake ring 66 is splined as shown at 67 to control ring 68, on which are mounted a plurality of spring seats 70 and a valve actuating arm 72. Also mounted on and for movement with the control ring are a plurality of slotted ears 74. The slots 76 of ears 74 are adapted to receive stop pins 78 which are mounted against movement in the spider 80, which forms a part of the transmission housing.

Springs 82 are compressed between spring seats 70 on control ring 68 and adjustable seats 84. Valve actuating arm 72 engages the end of a piston valve 86 to close off or prevent communication between annular passages 88 and 90. Annular passage 88 is connected to be supplied with hydraulic fluid from any suitable source. The passage of fluid to the annular space 88 is controlled by a solenoid valve 92 which is actuated by any suitable speed responsive device such as governor 94 (Fig. 2). Annular passage 95 communicates with passage 90 and permits the draining of hydraulic fluid from passage 90 with piston valve 86 in the position shown in Fig. 3. Annular passage 90 is connected with cylinder 62. A similar valve means controls flow of fluid under pressure to cylinder 22 which actuates piston 20.

Governor 94, driven by one of the gears rotating on counter shaft 32, may be any suitable two-stage governor, set to close or open two electric circuits at two different speeds. The details of this governor will not be gone into here because the governor details themselves are not the invention. A schematic diagram of the governor is shown in Fig. 5. As shown there, the governor comprises a split shaft having two parts 96 and 98. A small ball 100 is associated with portion 96 of the shaft and the large ball 102 is associated with the split portion 98. Ball 100, being lighter than ball 102, will require a higher speed to close its contacts 104 than will be required by ball 102 to close its contacts 106. It will, of course, be understood by those skilled in the art that the showing of Fig. 5 is entirely schematic.

In Fig. 3, as shown, the solenoid of valve 92 will be connected to be energized by the closing of contacts 104 of governor 94. It will, of course, be understood that a similar solenoid operated valve, shown dotted at 108 of Fig. 1, is provided for the control of the planetary gear train shown to the left of spider 80 in Fig. 1. Valve 108 will be connected to be energized by the closing of contacts 106 of governor 94.

At the top of Fig. 3 there is shown a small hydraulic damper consisting of a hollow piston 110 reciprocable in cylinder 112. At the right end of cylinder 112 there is provided a small bleed port 114. Piston 110 is engaged by lug 116 on control ring 68. In order that piston 110 may be sure to follow lug 116 as springs 82 are compressed, a light spring 118 is provided inside piston 110.

Power may be supplied to input shaft 2 through a conventional friction clutch or through a fluid fly wheel and a disengaging clutch.

Operation

In operation, shifter bar 34 is moved forward to put gear 28 in position for forward drive, as shown in Fig. 1. Power is supplied to input shaft 2 and gear 4. Gear 4 drives gear 24 through the planet gears 6 and 8. The reaction torque, or resistance to forward motion offered by the vehicle, makes planet gears 6 and 8 and the planet carrier 12 want to rotate backwards or counter-clockwise as seen in Fig. 3. (Remember that the planet gear train of carrier 12 is similar to the planet gear train and associated mechanism shown in Fig. 3.)

As the planet carrier 12 tends to rotate in the opposite direction from the rotation of power gear 4, one-way brake 14 is set and control ring 68' is rotated to its limit against stop pins 78 compressing its associated torque reaction springs. (These will be substantially the same as springs 82 shown in Fig. 3.)

The angle through which control ring 68' rotates depends on the amount of resistance, or torque reaction offered by the vehicle. If the torque reaction is high, the control ring 68' will rotate enough to close the valve in the hydraulic line supplying fluid to cylinder 22. This valve will be similar to valve 86 shown in Fig. 3. Thus if the torque reaction is high, the closing of contacts 106 by governor ball 102 (at the first predetermined speed), energizes the solenoid of valve 108 but will not actuate the cone clutch brake mounted on shaft 10 of planet carrier 12. As soon as the torque has fallen off sufficiently, the torque reaction springs will rotate control ring 68' back far enough to permit passage of fluid through the valve, whereupon fluid will be admitted into cylinder 22. Piston 20 will then move to the right as seen in Fig. 1 and will set the cone clutch brake. With the brake set, the entire planetary gear train will rotate as a unit providing direct drive of intermediate shaft 42 by input shaft 2. The transmission will then be in second gear.

As the vehicle accelerates to reach the second predetermined speed, small ball 100 closes contacts 104 and energizes the solenoid to open valve 92. If the torque reaction is high, the tendency of planet carrier 52 to rotate in the reverse direction will, through the one-way brake 54, compress springs 82 and close piston valve 86. Fluid will then not be able to reach cylinder 62 and the vehicle will continue to be driven through the gear reduction of the second planetary gear train. As the torque reaction falls off, springs 82 will rotate control ring 68 back far enough to permit fluid to pass from annular passage 88 to annular passage 90 and thence to cylinder 62, moving piston 60 to the left and engaging the planet gear brake. Thereupon the planetary gear train of planet carrier 52 will rotate as a unit, providing direct drive of output shaft 25, intermediate shafts 27 and intermediate shaft 42 by input shaft 2. In direct drive, all of the one-way clutches and brakes 38, 14, 54 and 36 will be unlocked to permit rotation in the forward direction of all elements.

As the vehicle speed decreases, ball 100 of governor 94 opens contacts 104 to de-energize the solenoid of valve 92. Valve 92 thereupon closes, cutting off communication of cylinder 62 with the source of fluid pressure. Cylinder 62 is unloaded through annular passage 95 of piston valve 86 (Fig. 3), and disengaging spring 120 unlocks the planet gear brake, again permitting power to be transmitted through the gear reduction provided by the planetary train of carrier 52. When the speed decreases sufficiently to open contacts 106 of governor 94, the solenoid of valve 108 is de-energized, and cylinder 22 is cut off from communication with the fluid pressure source. The planet gear brake of the first planetary train is then released, permitting drive through the gear reduction of that gear train.

We claim:

1. In a transmission, an input sun gear and a drive shaft connected therewith, an output sun gear and a driven shaft connected therewith, a planet gear meshing with said sun gears, a rotatable mounting means for the planet gear whereby same may rotate about the sun gears, a transmission casing provided with means for rotatably supporting said planet gear mounting means, a spring biased control ring supported by said casing for limited movement in one direction only and responsive to torque reaction of said driven shaft to rotate said control ring against the influence of the spring means urging said control ring in the opposite direction, fluid actuated brake means operable to lock the planet gear against rotation about its axis, a source of fluid pressure, a fluid line connecting said source of fluid pressure to said fluid actuated brake means, and a valve in said fluid line and actuated by movement of said control ring to open said fluid line in response to a predetermined decrease in the torque reaction.

2. In a transmission, an input sun gear and a drive shaft connected therewith, an output sun gear and a driven shaft connected therewith, a planet gear meshing with said sun gears, a rotatable mounting means for the planet gear whereby same may rotate about the sun gears, a transmission casing provided with means for rotatably supporting said planet gear mounting means, a control ring rotatably supported by said casing, spring means urging said ring in one direction, said ring moved in the opposite direction in response to a torque reaction of said driven shaft, and means controlled by said control ring to lock said planet gear against rotation about its own axis in response to a predetermined decrease in torque reaction.

3. In a transmission, an input sun gear and a drive shaft connected therewith, an output sun gear and a driven shaft connected therewith, a planet gear meshing with said sun gears, a rotatable mounting means for the planet gear whereby same may rotate about the sun gears, a transmission casing provided with means for rotatably supporting said planet gear mounting means, a control ring rotatably supported by said casing, spring means urging said ring in one direction, said ring moved in the opposite direction in response to a torque reaction of said driven shaft, and means controlled by said control ring to lock said planet gear against rotation about its own axis in response to a predetermined decrease in torque reaction, said means including a speed responsive device controlling admission of fluid under pressure to said last-mentioned means, and a valve intermediate said means and said fluid inlet controlled by said control ring to interrupt said fluid connection under the influence of relative high torque reaction and to open said fluid connection as the torque reaction is reduced to a predetermined degree.

4. In a transmission, an input sun gear and a drive shaft connected therewith, an output sun gear and a driven shaft connected therewith, a planet gear meshing with said sun gears, a rotatable mounting means for the planet gear whereby same may rotatate about the sun gears, a transmission casing provided with means for rotatably supporting said planet gear mounting means, a control ring rotatably supported by said casing, spring means urging said ring in one direction, said ring moved in the opposite direction in response to a torque reaction of said driven shaft, and means controlled by said control ring to lock said planet gear against rotation about its own axis in response to a predetermined decrease in torque reaction, said means including a speed responsive device controlling admission of fluid under pressure to said last-mentioned means, and a valve intermediate said means and said fluid inlet controlled by said control ring to interrupt said fluid connection under the influence of relative high torque reaction and to open said fluid connection as the torque reaction is reduced to a predetermined degree, said valve comprising a spring biased plunger, and an ear on said control ring actuating said valve plunger.

PETER ALTMAN.
MALVERN S. BAKER.

REFERENCES CITED

The following references are of record in the file of this patent:

UNITED STATES PATENTS

| Number | Name | Date |
| --- | --- | --- |
| 1,722,546 | Wheeler | July 30, 1929 |
| 1,795,464 | Banker | Mar. 10, 1931 |
| 2,022,689 | Rainsford | Dec. 3, 1935 |
| 2,122,701 | Segard | July 5, 1938 |
| 2,143,452 | Reynolds | Jan. 10, 1939 |
| 2,174,835 | Rainsford | Oct. 3, 1939 |
| 2,409,506 | McFarland | Oct. 15, 1946 |